US006823502B2

United States Patent
Wingren et al.

(10) Patent No.: US 6,823,502 B2
(45) Date of Patent: Nov. 23, 2004

(54) PLACEMENT OF CONFIGURABLE INPUT/OUTPUT BUFFER STRUCTURES DURING DESIGN OF INTEGRATED CIRCUITS

(75) Inventors: Matthew Scott Wingren, Rochester, MN (US); George Wayne Nation, Eyota, MN (US); Gary Scott Delp, Rochester, MN (US); Jonathan William Byrn, Kasson, MN (US)

(73) Assignee: LSI Logic Corporation, Milpitas, CA (US)

( * ) Notice: Subject to any disclaimer, the term of this patent is extended or adjusted under 35 U.S.C. 154(b) by 116 days.

(21) Appl. No.: 10/334,568

(22) Filed: Dec. 31, 2002

(65) Prior Publication Data

US 2004/0128626 A1 Jul. 1, 2004

(51) Int. Cl.[7] ................................................. G06F 17/50
(52) U.S. Cl. .................................. 716/9; 716/8; 716/10
(58) Field of Search ................................... 716/9, 8, 10

(56) References Cited

U.S. PATENT DOCUMENTS

| 4,656,592 A | 4/1987 | Spaanenburg et al. |
| 5,818,728 A | 10/1998 | Yoeli et al. |
| 5,818,729 A | 10/1998 | Wang et al. |
| 6,459,136 B1 | 10/2002 | Amarilio et al. |

FOREIGN PATENT DOCUMENTS

| JP | 410021065 A | * 1/1998 | ............. G06F/9/06 |
| JP | 01202397 | 7/2001 | |
| JP | 02202886 | 7/2002 | |

* cited by examiner

Primary Examiner—Matthew Smith
Assistant Examiner—Sun James Lin
(74) Attorney, Agent, or Firm—Ojanen Law Offices

(57) ABSTRACT

A tool for designing an integrated circuit and semiconductor product that generates correct RTL for I/O buffer structures in consideration of the requirements of diffused configurable I/O blocks and/or I/O hardmacs of the product. Given either a slice description of a partially manufactured semiconductor product, a designer can generate the I/O resources of an application set. Then given an application set having a transistor fabric, and the diffused configurable I/O blocks and/or the I/O hardmacs, and a plurality of accompanying shells, the I/O generation tool herein automatically reads a database having the slice description and generates the I/O buffer structures from the transistor fabric. The I/O generation tool further conditions and integrates input from either or both customer having her/his own logic and requesting a specific semiconductor product or from IP cores with their preestablished logic. The I/O generation tool creates correct RTL from the transistor fabric for correct placement, timing, testing, and function of I/O buffer amplifiers for the semiconductor product, either incrementally or globally. Once I/O buffer structures are created, they are qualified by a plurality of shells including a verification shell, a static timing analysis shell, a manufacturing test shell, and a RTL analysis shell.

22 Claims, 5 Drawing Sheets

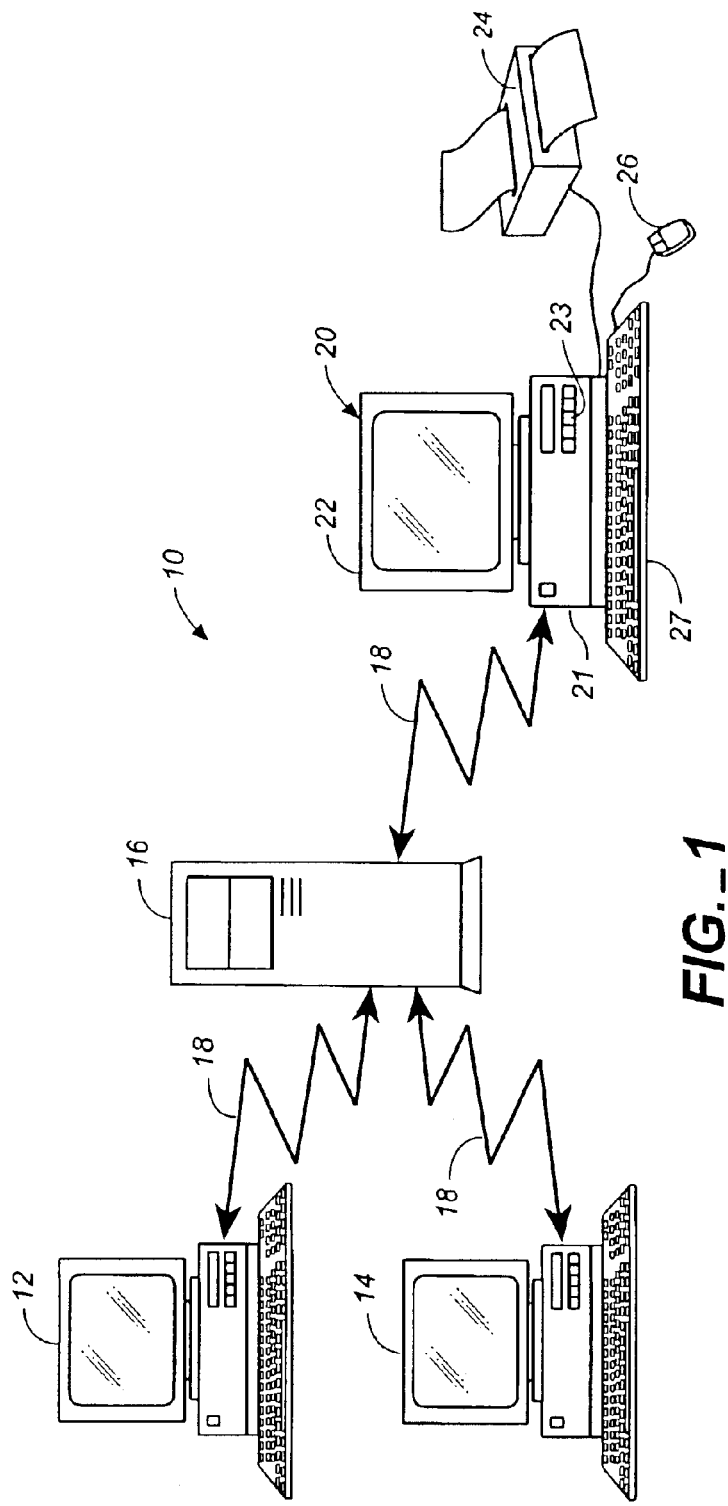
FIG._1

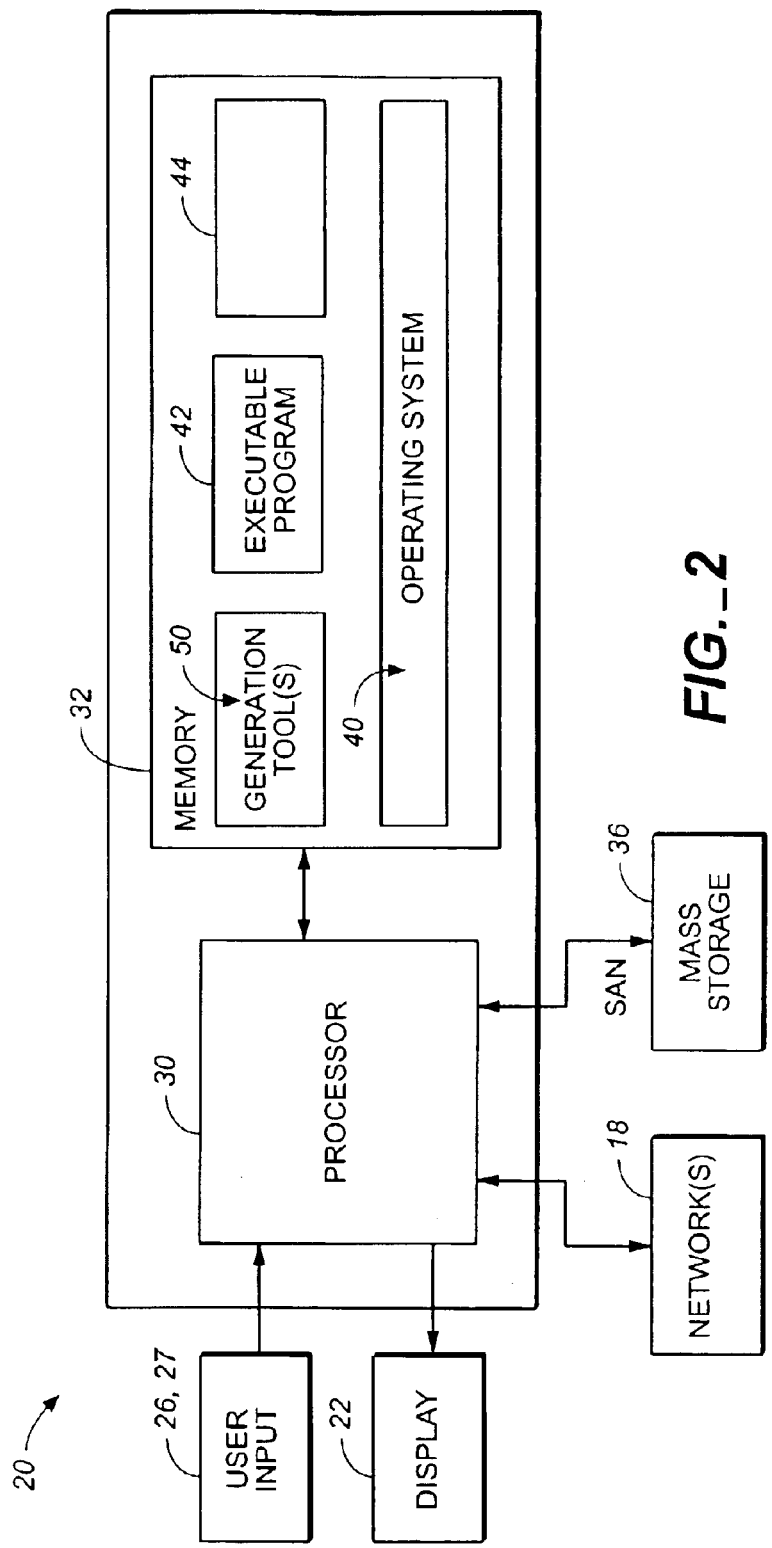
FIG._2

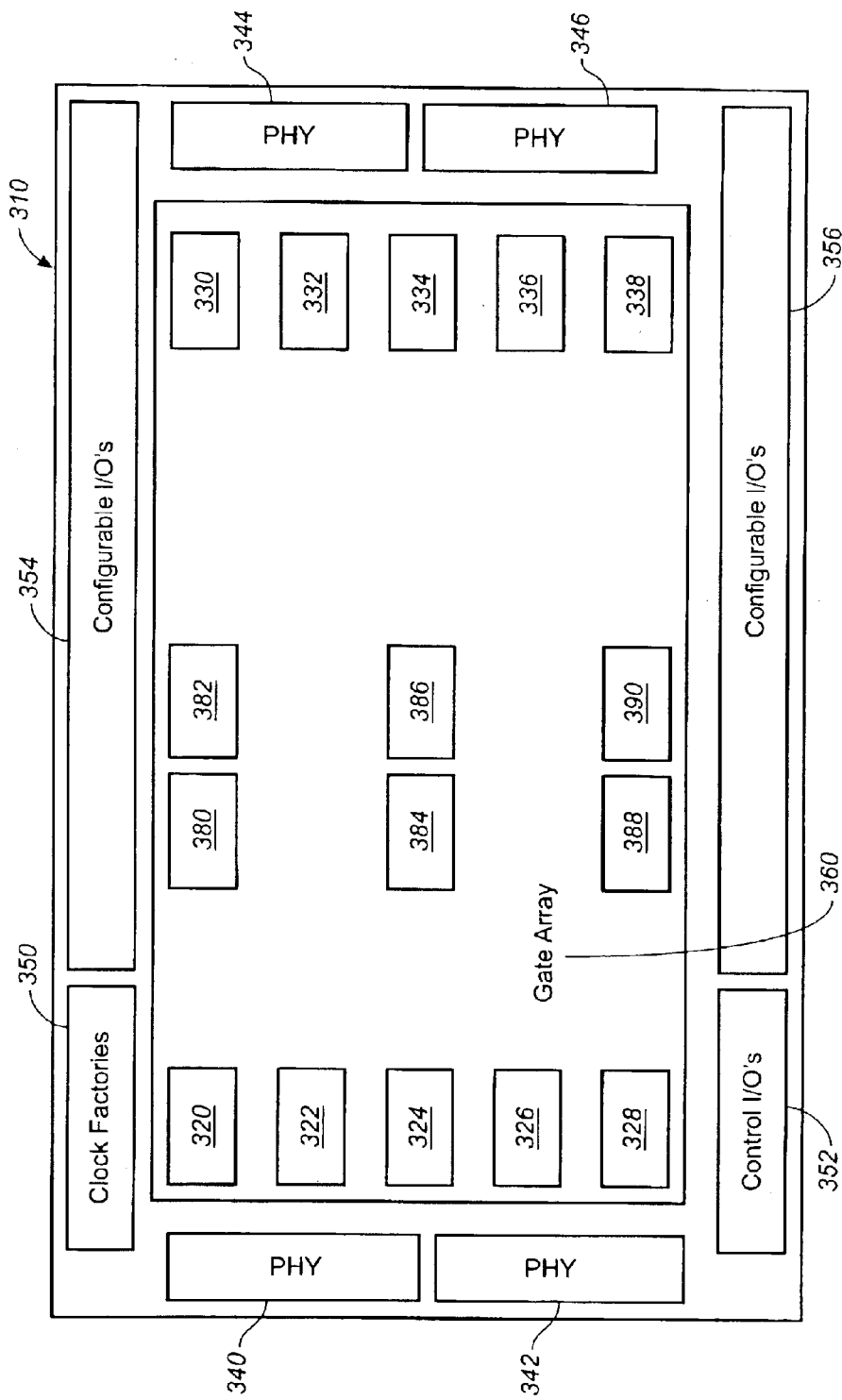
FIG._3

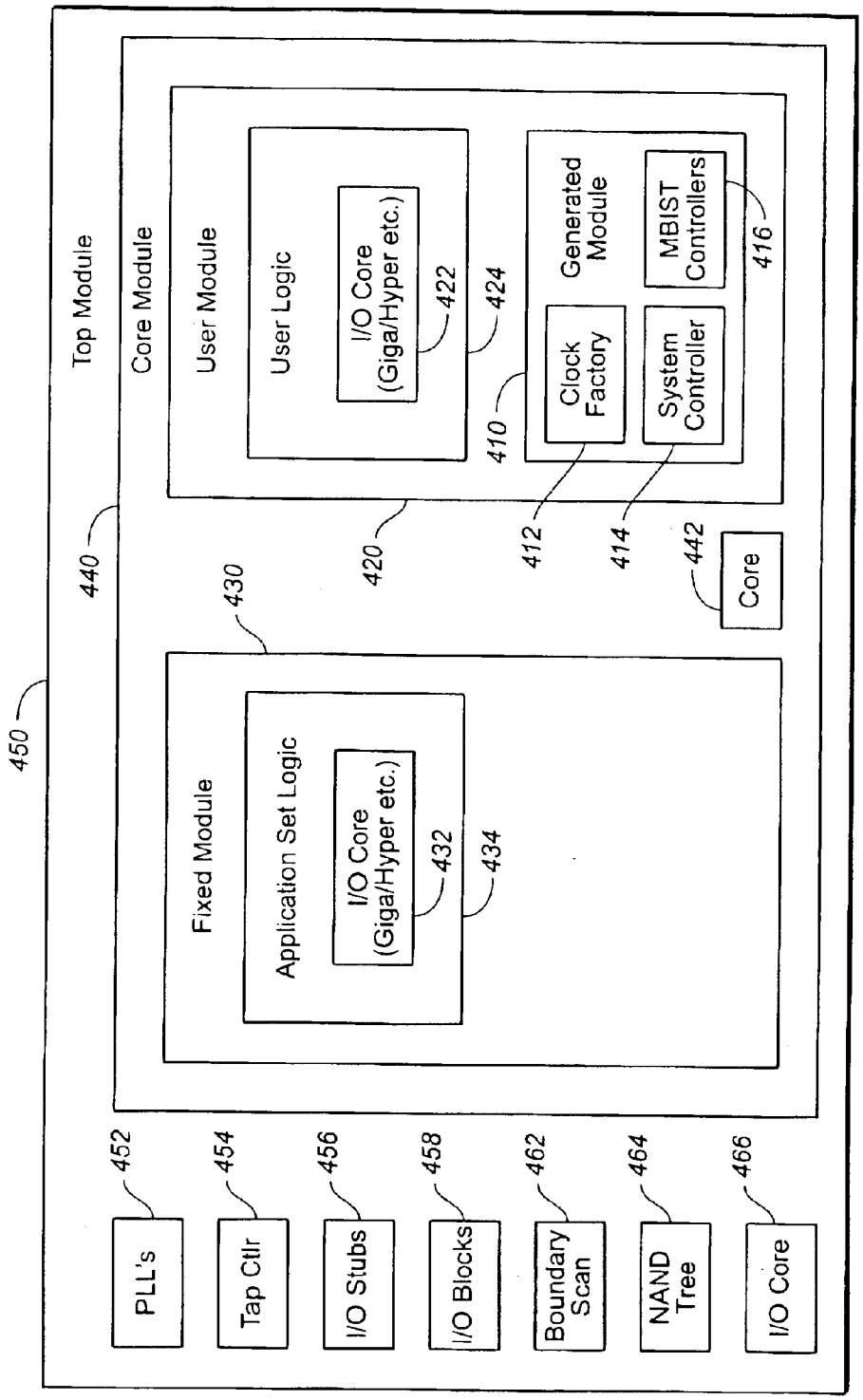
FIG._4

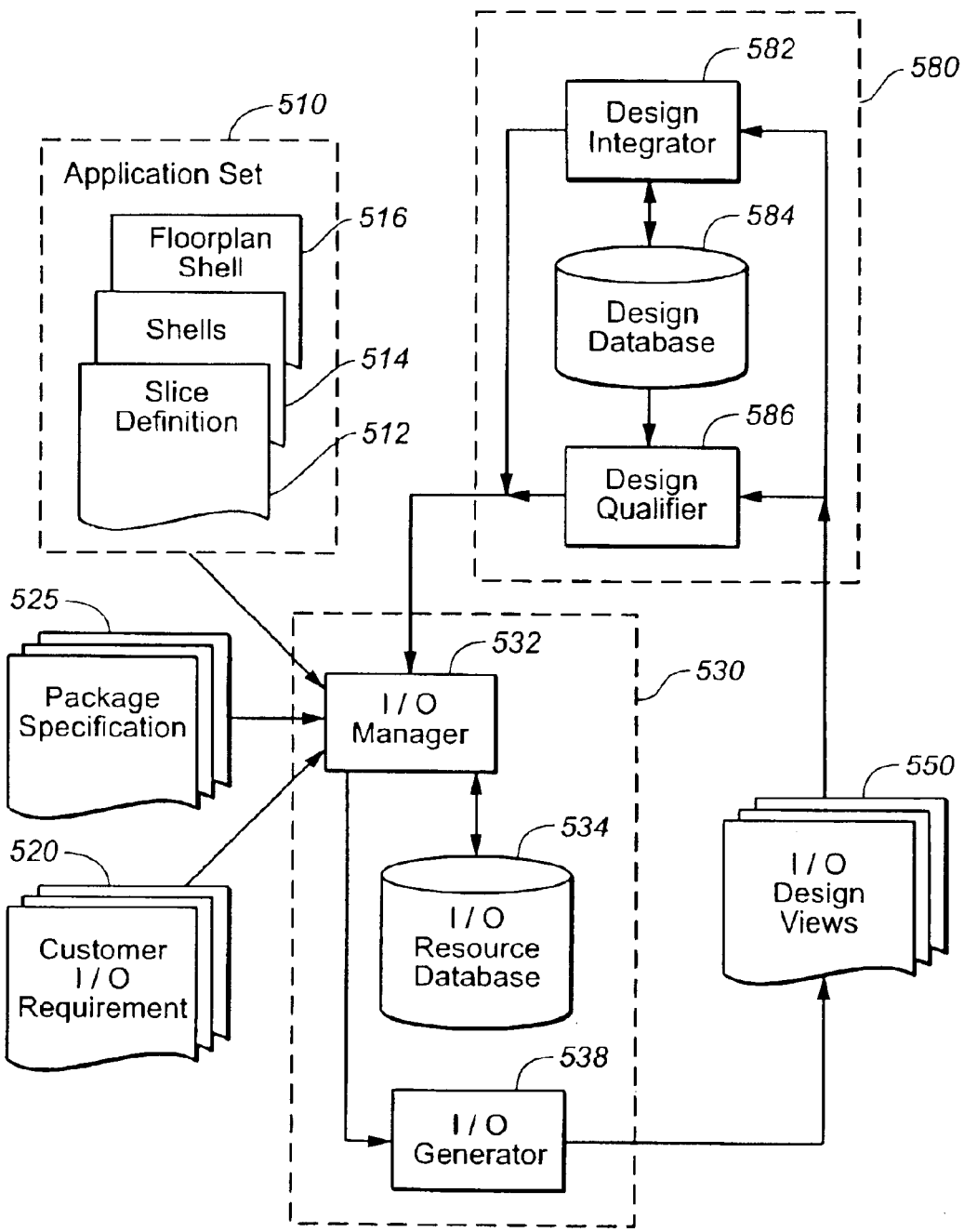
FIG._5

PLACEMENT OF CONFIGURABLE INPUT/ OUTPUT BUFFER STRUCTURES DURING DESIGN OF INTEGRATED CIRCUITS

CROSS REFERENCE TO RELATED APPLICATIONS

The present application is related to the following United States Patent Applications, which are hereby incorporated by reference in their entireties: entitled Flow Control Enhancement filed 20 Dec. 2002; entitled A Process for Delivering Slices, Shells, Design and Rapid Product; U.S. patent application Ser. No. 10/318,792 filed 13 Dec. 2002 entitled Flexible Template Having Embedded Gate Array and Composable Memory for Integrated Circuits; entitled Automated Selection and Placement of Memory During Design of an Integrated Circuit, filed 13 Dec. 2002; entitled A Simplified Process to Design Integrated Circuits, filed 31 Dec. 2002; entitled An Automated Method for Documenting, Implementing, and Testing ASIC Registers and Memory.

FIELD OF THE INVENTION

This invention relates generally to the field of electronic circuit design and more particularly relates to developing a design template for implementation of input and output buffer structures of an integrated circuit during chip development.

BACKGROUND

Integrated circuits comprise many transistors and the electrical interconnections between them. Depending upon the interconnection topology, transistors perform Boolean logic functions like AND, OR, NOT, NOR and are referred to as gates. Some fundamental anatomy of an integrated circuit will be helpful for a full understanding of the factors affecting the flexibility and difficulty to design an integrated circuit. An integrated circuit comprises layers of a semiconductor, usually silicon, with specific areas and specific layers having different concentrations of electron and hole carriers and/or insulators. The electrical conductivity of the layers and of the distinct areas within the layers is determined by the concentration of dopants within the area. In turn, these distinct areas interact with one another to form transistors, diodes, and other electronic devices. These specific transistors and other devices may interact with each other by field interactions or by direct electrical interconnections. Openings or windows are created for electrical connections between the layers by a combination of masking, layering, and etching additional materials on top of the wafers. These electrical interconnections may be within the semiconductor or may lie above the semiconductor areas and layers using a complex mesh of conductive layers, usually of metal such as aluminum, tungsten, or copper fabricated by deposition on the surface and selective removal, leaving the electrical interconnections. Any of these semiconductor or connectivity layers may be separated by insulative layers, e.g., silicon dioxide.

Integrated circuits and chips have become increasingly complex, with the speed and capacity of chips doubling about every eighteen months. This increase has resulted from advances in design software, fabrication technology, semiconductor materials, and chip design. An increased density of transistors per square centimeter and faster clock speeds, however, make it increasingly difficult to specify and design a chip that performs as actually specified. Unanticipated and sometimes subtle interactions between the transistors and other electronic structures may adversely affect the performance of the circuit. These difficulties increase the expense and risk of designing and fabricating chips, especially those that are custom designed for a specific application. The demand for complex custom-designed chips increase with the increasing variety of microprocessor-driven applications and products have burgeoned, yet the time and money required to design chips have become a bottleneck in the time it takes to bring these products to market. Without an assured successful outcome within a specified time, the risks have risen with the costs, and the result is that fewer organizations are willing to attempt the design and manufacture of custom chips.

The challenge of complexity has been met by introducing more powerful specialized software tools intended to design chips correctly and efficiently. As the software tools evolve, however, the tools themselves have become increasingly complex requiring more time to master and use them. Correspondingly, the cost of staffing, training, and coordinating the various aspects of chip design has also increased. One general response to this dilemma has been a call for what are termed "higher levels of abstraction," which simply means that the logical entities with which designers work are standardized, encapsulated, and bundled together so they can be treated like black box functions. This abstraction has characterized the semiconductor industry throughout its history. Today, however, the software tools used in chip design are so complex that it is difficult to adapt them to this higher level of abstraction. Coordinating these realms of complexity is a challenge in the design and fabrication of a custom chip. Customer needs and specifications must be aligned with tools and capabilities of both designers and fabrication facilities. Each fabrication facility, for example, operates with design rules, equipment, molds, recipes and standards that have myriad implications for the final work and must be considered early in the process.

Meanwhile, several types of chips have been developed that take advantage of this modular approach; they are partly fixed and partly programmable/customizable. The utility of these chips is limited by factors such as complexity, cost, time, and design constraints. The field programmable gate array (FPGA) refers to type of logic chip that can be reprogrammed. Because of the programmable features, FPGAs are flexible and modification is almost trivial. FPGAs, however, are very expensive and have the largest die size. The disadvantage of FPGAs, moreover, is their relatively high cost per function, relatively low speed, and high power consumption. FPGAs are used primarily for prototyping integrated circuit designs, and once the design is set, faster hard-wired chips are produced. Programmable gate arrays (PGAs) are also flexible in the numerous possible applications that can be achieved but not quite as flexible as the FPGAs, and are more time-consuming to modify and test. An application specific integrated circuit (ASIC) is another type of chip designed for a particular application. ASICs are efficient in use of power compared to FPGAs and are quite inexpensive to manufacture at high volumes. ASICs, however, are very complex to design and prototype because of their speed and quality. Application Specific Standard Products (ASSPs) are hard-wired standard chips that meet a specific need but this customization is both time-consuming and costly. An example of an ASSP might be a microprocessor in a heart pacemaker.

Semiconductor chips require many different input signals. Such input signals include power and ground voltages for the circuits, signals often of a known 1 and 0 sequences to test the logic and the function of the circuits, signals used to configure or change the logic, and of course, the data signals that are processed by the circuit. Semiconductor chips also output a myriad of signals, depending upon the function of the chip. The signals and the interfaces that provide the input and output signals of a chip are, in general, referred to as its input/output (I/O) specifications. I/O's are a critical resource that can be difficult to handle when designing an integrated chip. One trend is to consider the I/Os of a chip earlier in the design process but that decision results in some of the decisions and trade-offs being made for a larger problem space than encompassed by a single chip or a single design. The industry is thus seeking an automated and simple technique for insertion and care of I/Os in the design of a semiconductor chip that comfortably addresses the added complexity for smaller chips.

Typically, today's semiconductor chips have high speed differential interfaces for its input and output signals; high speed in that the data is on the order of gigabits per second, and differential meaning that the data is encoded in a voltage between the normal digital high voltage as a "1" and the normal digital low voltage as a "0". A differential voltage enables faster data transfer rates because of smaller voltage transitions. There are several high speed serial interfaces, and, ranked in approximate order of speed from slowest to fastest, they are: emitter coupled logic (ECL), positive emitter-coupled logic (PECL), low voltage differential signaling (LVDS), and current mode logic (CML). ECL is the traditional high-speed logic technology, originally based on bipolar transistor differential pairs with a negative bias supply. PECL is a form of ECL referenced to a positive bias. ECL devices have propagation delays in the region of 200 picoseconds and toggle frequencies over 3 GHz. Of all the interfaces available today, CML swings at about one-half volt, operates at the highest speed, and is used in applications requiring gigabit data rates. LVDS is a low noise, low power, low amplitude method for data transmission over copper wire at the gigabits per second range. Low voltage means that, in accordance with an industry standard, the differential signals have an amplitude ranging from 250 millivolts to 400 millivolts at an offset of 1.2 volts. LVDS uses a dual wire system running 180 degrees of each other so that noise is filtered easily and effectively. ECL and PECL transmitter-output signal swings are higher and the propagation delays are shorter than those of LVDS transmitters, thus ECL and PECL devices dissipate power and thus heat more.

The complexity of designing I/Os increases when using an embedded array having configurable I/O or a mix of configurable and standard cell I/Os. Although the position of the I/O interface may be fixed on the chip, it may have to be customized using metal layers for different designs. Other determining factors to be considered include the desired type and direction of the I/O, the test structures that must be inserted and connected, any I/O affinity logic that must be associated to interior circuits on the chip, the effect of simultaneously switching outputs on power sources, and the voltage level of the desired I/O type. Thus, the configuration and placement of the I/O during the design of an integrated chip is a non-trivial and somewhat daunting task.

There is thus a need in the industry to increase the flexibility of the design process of the integrated circuits yet at the same time reduce the cost of each individual design.

SUMMARY OF THE INVENTION

To satisfy the above needs and to realize further advantages, the inventors herein present a tool to generate input/output (I/O) buffer structures from a partially manufactured semiconductor slice using an I/O generation tool. The I/O generation tool can be used to create the I/O resources of the slice. Input to the I/O generation tool is a simple database of available resources of the slice and a desired configuration of a semiconductor product. From these, the I/O generation tool generates correct RTL from the transistor fabric of the I/O resources in the slice. In more detail, the I/O generation tool comprises an I/O manager having as input a description of a slice and a request for at least one I/O buffer structure, an I/O resource database comprising a plurality of available I/O resources of the slice description, at least a portion of the I/O resources comprising a transistor fabric, wherein the I/O manager is capable of allocating candidate I/O resources from the available I/O resources of the slice to satisfy the request, and an I/O composer capable of generating connect and test RTL from the transistor fabric and I/O designs of the allocated I/O resources to satisfy the request. The available I/O resources may be a diffused configurable I/O block, and/or a I/O hardmac.

The I/O buffer structure generation tool further comprises a plurality of shells to qualify the generated I/O designs, the plurality of shells comprising: an RTL analysis shell to analyze connect and test RTL; a verification shell to verify the connect and test RTL; a manufacturing test shell to implement at least logic tests, scan tests, self-tests, etc. on the I/O resources and the connect and test RTL; and a static timing analysis shell to verify correct timing of clock and signals within the I/O resources and the connect and test RTL. The shells are used to create the design views wherein the generated I/O designs may comprise a top module having a first test controller to test the top module, at least one phase locked loop, at least one configurable I/O and/or I/O hardmac I/O, and a netlist of the I/O resources; if necessary, the top module may further comprise a stub file of the RTL to terminate any unused configurable and/or hardmac I/O resources. The shells further help generate, validate, and test a generated module of the I/O design views, the generated module comprising a clock generator, a system controller, a second test controller to test a plurality of resources of the slice description other than resources in the top module. A user module incorporates the generated module and the I/O logic resources provided with the request. A fixed module, as part of an application set having the slice description and the plurality of shells, matches and binds any diffused configurable I/O and/or hardmac I/Os included in the slice description. A core module interconnects the fixed module and the user module.

The I/O buffer structure generation tool can operate in an incremental mode, considering one additional request for an I/O buffer structure or a small change to the I/O resources of the slice, or it can operate globally, considering not only all of the I/O buffer structures, diffused configurable I/Os, hardmac I/Os, if any, but functions and blocks other than the I/O of the semiconductor product.

Also presented herein is a method of generating I/O designs for a generated semiconductor product, comprising the steps of: inputting a database of a description of an application set, the application set having a shell description comprising a transistor fabric and at least one available diffused configurable I/O resource and/or at least one available I/O hardmac into an I/O resource database, inputting a request for an I/O buffer structure; and allocating a portion of the transistor fabric and generating RTL of the requested I/O buffer structure. The method further analyzes, verifies and tests the logic and timing of the allocated portion of the transistor fabric and generated RTL of the requested I/O buffer structure using a plurality of shells comprising at least a RTL analysis shell, a verification shell, a static timing analysis shell, and a manufacturing test shell. The shells may further include a documentation shell, a synthesis shell, and a floorplan shell to generate at least a documentation design view and a location design view of the physical location of the first and subsequent requested I/O buffers structures of the generated semiconductor product.

BRIEF DESCRIPTION OF THE DRAWINGS

The numerous advantages of the present invention may be better understood by reference to the accompanying figures in which:

FIG. 1 is a simplified block diagram of a networked computer system in which the method and the tool of the invention can be implemented.

FIG. 2 is a simplified block diagram of a computer workstation to which an integrated circuit developer may access and use the I/O generation tool in accordance with an embodiment of the invention.

FIG. 3 is a simplified block diagram of a semiconductor slice from which the I/O generation tool could generate an I/O buffer structure and the logic for it and other fixed I/Os of an integrated circuit in accordance with an embodiment of the invention.

FIG. 4 is a simplified diagram illustrating the hierarchy of logic of the I/O generation tool implemented on a slice description in accordance with features of the invention.

FIG. 5 is a simplified block diagram of the inputs to and outputs from the process by which I/O buffer structures may be configured into an integrated circuit in accordance with an embodiment of the invention. It is suggested that FIG. 5 be printed on the face of the patent.

DESCRIPTION OF THE INVENTION

Referring to the drawings, FIG. 1 illustrates an exemplary computer system 10 upon which a generation tool as disclosed herein could be installed and/or used. Computer system 10 is illustrated as a networked computer system that includes one or more client computers 12, 14 and 20 such as workstations coupled through a network 18 to a server 16. Server 16 could also be a personal computer-based server, a minicomputer, a midrange computer, or a mainframe computer. While shown here as a point-to-point connection, computers 12 and 14 need not be coupled to server 16 directly, but may be coupled to yet another network which in turn is connected to server 16. Network 18 may represent practically any type of networked interconnection including but not limited to local-area, wide-area, wireless, and public networks such as the Internet, and any number of routers and hubs connected in between, e.g., a local-area network to a wide-area network to the Internet through a series of routers and/or other servers. Any number of computers and other devices may be networked through network 18, e.g, multiple servers, hand-held devices, etc.

For the purposes of the invention, computer 20 may represent practically any type of computer, computer system, or other programmable electronic device, including a client computer similar to computers 12, 14 and 20 of FIG. 1, a server computer, e.g, similar to server 16 of FIG. 1, a portable computer, an embedded controller, a hand-held device, etc. Computer 20 may be coupled in a network as shown in FIG. 1 or may be a stand-alone device. Computer 20 will hereinafter also be referred to as a computer although it should be appreciated that the term "computer" may also include other suitable programmable electronic devices capable of allowing a chip designer to use the generation tool.

With reference to FIG. 2 wherein the method and apparatus of designing configurable I/O buffer structures as disclosed herein is installed as an application on computer 20. Computer 20 typically includes at least one processor 30 coupled to a memory 32. Processor 30 may represent one or more processors or microprocessors and memory 32 may represent the random access memory (RAM) devices comprising the main storage of computer 30, as well as any supplemental levels of memory such as cache memories, nonvolatile or backup memories, programmable or flash memories, read-only memories, etc. In addition, memory 32 may be considered to include memory storage physically located elsewhere in computer 30, e.g., any cache memory in a processor 30, as well as any storage capacity used as a virtual memory, e.g., as stored on a mass storage device 36 coupled to computer 20 with a storage area network (SAN) or on another computer coupled to computer 20 via network 18.

Computer 20 typically receives a number of inputs and outputs for communicating information externally. For interface with a user or operator, computer 20 typically includes one or more user input devices 26, 27, e.g., a keyboard, a mouse, a trackball, a joystick, a touchpad, and/or a microphone, among others, and a display 22 such as a CRT monitor, an LCD display panel, and/or a speaker, among others. It should be appreciated, however, that some server implementations may not support direct user input and output.

For additional storage, computer 20 may also include one or more mass storage devices 36, e.g., a floppy or other removable disk drive, a hard disk drive, a direct access storage device, an optical drive, e.g., a CD drive, a DVD drive, etc., and/or a tape drive, among others, that may be connected directly or may be connected through a SAN or other network. Furthermore, computer 20 may include an interface connected to one or more networks 18, e.g., a local-area network, a wide-area network, a wireless network, and/or the Internet, among others, to permit communication of information with other computers coupled to the network. It should be appreciated that computer 20 typically includes suitable analog or digital interfaces between processor 30 and each of the components 18, 22, 26, 27, and 36 as is known in the art.

Computer 20 operates under the control of an operating system 40 such as a UNIX-based or WINDOWS-based operating system, as is known in the art, but is not so limited by the particular operating system. Operating system 40 executes various computer software applications, components, programs, objects, modules, etc., such as an executable program 42, etc. Although the I/O generation tool 50 may be in memory 32 for the purpose of developing an integrated circuit, it need not be. The processor 30 may access the I/O generation tool, the required data, other various applications components, programs, objects, modules, etc., resident on one or more processors in another computer coupled to computer 20 via a network 18, e.g., in a distributed or client-server computing environment whereby the processing to implement the functions of the I/O generation tool may be allocated to multiple computers over a network.

In general, the I/O generation tool executed to implement the embodiments of the invention whether implemented as part of an operating system or a specific application, component, program, object, module, or sequence of instructions will be referred to herein as the I/O generation tool, Gen I/O, or just simply, the tool. The tool typically comprises one or more instructions that are resident at various times in various memory and storage devices in a computer, and that, when read and executed by one or more processors in a computer network, cause that computer to perform the steps necessary to execute steps or elements embodying the various aspects of the invention. While the invention has and hereinafter will be described in the context of fully functioning computers and computer systems, those skilled in the art will appreciate that the various embodiments of the invention are capable of being distributed as a program product in a variety of forms and that the invention applies equally regardless of the particular type of signal bearing media used to actually carry out the distribution. Examples of signal bearing media include but are not limited to recordable type media such as volatile and nonvolatile memory devices, floppy and other removable disks, hard disk drives, optical disks, e.g., CD-ROMs, DVDs, etc., among others, and transmission type media such as digital and analog communication links. It should be appreciated that any particular nomenclature that follows is used merely for convenience, and thus the invention should not be limited in its use solely to any specific application identified and/or implied by such nomenclature. The exemplary environments illustrated in FIGS. 1 and 2 are not intended to limit the present invention. Indeed, those skilled in the art will recognize that other alternative hardware and/or software environments may be used without departing from the scope of the invention.

The I/O generation tool described herein interprets elements of an application set, also described herein, and a customer I/O requirement for an integrated circuit. Preferably, the application set and the customer I/O requirement are programmed according to guidelines for easy interpretation of the tool, but need not be so. In turn, the I/O generation tool generates register transfer logic (RTL) and design views to satisfy the customer I/O requirement within the purview of an application set. The I/O generation tool is self-documenting and self-qualifying; preferably it shares the same user interface and database as other generation tools, such as disclosed in LSIL Docket 02-4774. A particularly useful feature of the I/O generation tool is that it may be updated in real time to store the state of what has been generated so far to enable the tool to execute iteratively for incremental design changes and the opportunity to observe the effects of the changes. Alternatively, the tool may be run in a batch process for global optimization of the I/O buffer structures. The I/O generation tool, other generation tools, the customer I/O and other requirements, and the application set may be on the same or different computers connected by a network as described above.

As mentioned, one of the inputs to the I/O generation tool is a slice description. The I/O generation tool herein facilitates the creation of base I/O resources on the slice, which includes the selection of a package as well as a die size for the slice. Also, I/O cores, such as HyperPHY, ULTRAHyperPHY, and GigaBLAZE that are trademarked high speed I/O transceivers manufactured by LSI Logic Inc., may be selected and installed during creation of the slice. Cores refer to any prefabricated logic and hardware that have an impact on or are physically affected by I/O buffer amplifiers. Once the package, die size and I/O cores are selected, bondout is done which typically requires some rearrangement of the I/O resources. Bondout is that process which corresponds the I/O connections on the printed circuit boards to the periphery of the semiconductor product through the connectivity layers, such as a metal stack or vias, to the actual element or circuit within the semiconductor chip. During creation of the slice, the number and nature of the I/O power groups or potential groups is controlled. From the slice, the resources for the application set and ultimately, the final chip product will be selected.

Viewing FIG. 3, a slice 310 is a partially manufactured semiconductor device in which the wafer layers up to the connectivity layers have been fabricated. The slice 310 comprises a base semiconductor wafer from, e.g., silicon, silicon-on-insulator, silicon germanium, gallium arsenide, other Type II, IIII, IV, and V semiconductors, etc. and is a piece of semiconductor material into which blocks or hardmacs have been diffused into the semiconductor layers. Diffusing a semiconductor wafer to create a hardmac simply means that during fabrication of the wafer layers, transistors or other electronic devices have been particularly arranged in the wafer layers to achieve specific functions, such as diffused memory 534–338, 380–390, data transceiver hardware such as I/O PHYs 340–346, clock factories including phase locked loops (PLLs) 350, control I/Os 352, input/output (I/O) hardmacs 354, 356; each of the hardmacs have an optimum arrangement and density of transistors to realize its particular function. The slice may also comprise at least one, probably several, configurable I/Os built on the transistor fabric but all that remains is the RTL to be generated to call out the metallization. The slice further comprises a gate array, called transistor fabric 360 for further development of the slice 310 using the I/O generation tool described herein. Transistor fabric 360 is an array of prediffused transistors in a regular pattern that can be logically configured by the I/O generation tool herein to achieve different functions. A cell refers to the personalization of the interconnect layers that instantiate the logic gates of the transistor fabric.

The slice definition is a detailed listing of all the features available on the slice, such as the transistor fabric, and the configurable and/or hardmac I/O and memory available, the requirements of the configurable and hardmac I/Os, the cost of the slice, the ideal performance that can be expected of the slice, the expected power consumption, and other functional requirements. For I/O elements, the slice definition may provide, inter alia, the types of I/O, the I/O drive strength, the location of the I/O cells, etc., including which of the three types of base layer the I/O diffused area comprises. The base layer of I/O diffused areas may be specifically diffused for: (1) data, test, control signals, (2) electrostatic discharge (ESD) protection for power buses; and (3) corners which require special attention. Other details of the slice definition may include the status of the logic, required control signals and the features enabled by the control signals, and whether any element undergoes testing, the location and the number of the elements on the slice, etc.

One of skill in the art will appreciate that the slice 310 shown in FIG. 1 is only one example of a slice and its components. Different slices may contain different amounts of transistor fabric, different amounts and types of diffused and/or compiled memories, different types of fixed and configurable I/O blocks, different types and amounts of I/O hardmacs, clocks, etc. depending upon the purpose of the final integrated chip. For instance, if the final chip is intended to be a communication and/or networking integrated circuit, the periphery of the slice may contain many I/O blocks that have been fixed as PHYs and/or that can be configured differently from one another by the I/O generation tool herein. The slice 310, moreover, optionally may include the contact mask and some of the fixed higher layers of connectivity for distribution of power, ground, and external signal I/O.

The slice itself is of little use to a designer needing to develop register transfer logic (RTL), so some representation of the diffused resources of the slice is needed; shells are aspects of this representation. Shells are the logic infrastructure that makes the slice useful as a design entity and together the shells and the slice description comprise one embodiment of an application set. The I/O generation tool herein includes the shells to facilitate not only further development of the application set, but also design and development of a final semiconductor chip product. Using the I/O generation tool and the accompanying shells, a chip designer can integrate her/his customer I/O requirement with the I/O resources of the slice, verify and synthesize I/O designs, insert clocks, test interconnects, integrate the designs together to create a complete design. The resultant design, moreover, is a qualified netlist with optimal placement and routing amongst the existing resources and for external connections to a board. To create a customized chip, all that is needed is a small set of remaining masks to create the interconnections between the preplaced elements or blocks.

Development of the application set for I/O buffer structures involves grafting an application set onto the resources embodied by a given slice, i.e., associating or binding the application set logic and I/O cores with specific slice resources. Binding the application set effectively and still allowing the remaining resources to support a reasonable set of possible chips requires some floor planning of the physical placement of the I/O and other blocks within the slice. It is during the development of the application set that the I/O resources used by the application set are configured. As an example, for an I/O having a fixed function, the I/O generation tool generates the RTL for the function. If, however, a birdirectional interface is used only for input, then the I/O generation tool would configure that I/O interface as an input during the development of the application set. Configurable I/Os are also logically and metal configured for use; for example, if the above interface were a configurable I/O interface instead of a fixed I/O interface, the configurable I/O diffused area might be metal configured as a bi-directional interface but logically configured only as an input. At this time, the I/O resources that are specified and used by the application set are effectively removed from the list of possible usable resources that can be used for other I/O purposes.

The concept of shells was mentioned earlier and there are a number of shells used as a basis for a designer to integrate her/his customer I/O requirement using a particular slice, and depending upon the designer's particular task; one or more of these shells can be used. These shells comprise: the RTL shells, the documentation shell, the verification shell, the synthesis shell, the static timing analysis shell, the manufacturing test shell, the floorplan shell, and the RTL qualification shell. The RTL shell provides a logical description of an aspect of the slice or of the generated or used resources. The documentation shell may be considered the functional description of the resources. The verification shell is the functional verification description, whereas the synthesis shell may be thought of as the generation description. The static timing analysis shell is the timing description, the manufacturing test shell is the test description, and the floorplan shell is a description of the location of the slice resources.

The RTL shells may be viewed as a hierarchy of logic, such as shown in FIG. 4. The inner module is called the generated module 410 and may include some preplaced, timed, and proven components, such as clock generators 412, system controller and reset logic 414, test controllers 416, analog serializers/deserializers (SERDES) hardmac components. The I/O generation tool creates or generates the RTL from the transistor fabric within the generated module given a customer I/O requirement, i.e., the I/O generation tool generates the functional logic from the transistor fabric surrounding the hardmacs and diffused configurable areas to satisfy the customer I/O requirement that are not supplied by the application set, by any IP cores, or by the customer. In some instances, a configurable I/O or fabricated hardmac may not be used, so it is stubbed; the I/O generation tool stubs these areas. The generated module 410 has connectivity requirements that extend throughout the various modules; it is the I/O generation tool that manages the connectivity of the I/O blocks to the top module 450.

Surrounding the RTL logic of the generated module 410 is the user module 420. Any customer logic provided is inserted in the user module 420, but is first conditioned by an RTL analysis tools to be quickly implemented. An example of such an RTL analysis tool is TERAFORM, a commercially available tool that identifies potential timing and design closure issues of the customer's specification early in the design cycle. The I/O generation tool described herein binds and matches the I/O blocks in the user module 420 to the corresponding I/O in the top module 450. As a user includes new I/O or deletes existing I/O via design changes, the connectivity from the inside of the design to the outside is managed by the I/O generation tool herein and its sister tools referenced in the beginning of this patent. Also included in the user module 420 is a list of ports having tie-offs, i.e.; the list of I/O ports that will not be used. This list may be generated by the I/O generation tool herein or may be provided as part of the customer's requirements.

The fixed module 430 is created as part of the application set creation process. An application set is, inter alia, a description of the slice and several shells that make the slice useful to a chip designer. The fixed module 430 may be as simple as a logic signals directly to external chip I/Os, or it may be more complex logic upon which the user module 420 can build. For example, the fixed module 430 of the RTL shell could include a complete PCI bus controller including all the connections to external I/Os and/or a DDR/SRAM memory controller, a processor sub-system, etc. The fixed module 430 may encompass those protocol layers on the interior of the slice and/or the IP cores 432 necessary for the hardmac PHYs, such as an XGXS to support data transfer at Gigabit Ethernet speeds, or a MW SPI4 core. Thus, the fixed module 430 may contain IP cores 432 that are matched and bound to the correct I/O in the top module. Preferably, it is the I/O generation tool described herein that matches and binds the I/O blocks and any IP cores 432 in the fixed module to the top module 450 and generates the port list for the fixed module 430.

The core module 440 is a set of logic interfaces that have been proven to be correct to connect the user module 420 with the fixed module 430. The I/O generation tool herein provides the association of a core module port name to a particular I/O type via signal name association. Although the core module 440 typically does not have any IP cores 442, there may be an instance in which an IP core 442 connects the fixed module 430 to the user module 420.

The top module 450 of the RTL shell comprises appropriate logic for the hardmacs and configured logic towards the periphery of the slice. The top module 450 thus contains the I/O blocks and I/O diffused areas. All of the I/O blocks that are used will be instantiated in the top module 450; these blocks typically include the PLLs 452, the I/O netlists of which the NAND tree 464 is a part, the JTAG tap controller 454, test logic 462, etc. The NAND tree 464 connects all of the I/O blocks used for testing. Some of these blocks may be IP cores 466 having proven and fixed logic. The I/O generation tool herein creates the NAND tree 464 of the I/O netlist of the top module 450. The I/O generation tool further provides the association of a particular I/O type to a physical I/O of the slice description and as part of this process it generates the information necessary for correct metallization of configurable I/O blocks of the slice description.

All of the unused I/O blocks and diffused areas in the top module 450 will be correctly terminated in a stubs file 456. In the case of an unused I/O, the connection may be terminated at an in-tie. All unused output signals may be tied to a zero-out-tie whose output drives the unused net. The enable signal for an unused output may be tied to the inactive state with either a zero-out-tie or a one-out-tie. Unused configurable I/O diffused areas may be connected to the stubs file 456. The stubs file 456 is contained in the top module 450 to prevent unused resources and their support logic from cluttering the user design with data that is of little to no value to the developer.

The top module 450 further comprises the PLLs 452 and any test wrappers and lock detect circuits. A number of interconnect templates of the input tables describe how the PLL 452 is integrated with the rest of the design based on the application set. For example, a user may wish to dynamically control the value of a PLL multiplier or observe lock detect. Using a clock tool, such as GenClock, an association may be created between the PLL 452 and a clock factory 412 in the generated module 410. The control signals that set the PLL multiplier, the range, and other parameters can be preset to a particular value or may be fed back into the system controller 414 in the generated module 410 to allow dynamic selection of the value from a tie bloc, or flop, or an I/O core, or all of the above.

Also within the top module is a JTAG TAP controller 454 that embodies a set of resources related to the possible I/O and memory configurations for that slice. The I/O generation tool makes the logical connections from the controller 454 to the I/O block that requires the possible configurations for test, and to the boundary scan logic. Preferably, the tap controller 454 includes the possible combinations of physical I/O types and boundary scan scenarios for appropriate and thorough testing. Thus, the I/O generation tool would only have to hook up the boundary scan chain, NAND chain 464, and connections to the tap controller 454. Preferably, naming conventions and structures are maintained throughout the I/O buffer structures, but the I/O generation tool facilitates preinsertion of the test structure.

In an embodiment of the invention, a process and a tool flow allows a design engineer of integrated circuits to specify, assign and configure I/O buffer structures from a pool of available devices and from the transistor fabric. The immediate context for this invention is for use with an integrated circuit with embedded arrays and having configurable input/output buffers either alone or in combination with standard or hardmac cell I/O buffers.

The I/O generation tool generally, inter alia, constructs the top module 450 and eventually creates the core module 440 and manages the port lists for the fixed module 430 and the user module 420. This I/O generation tool provides a design environment to facilitate quick changes of these modules without manual intervention. Referring now to FIG. 5, first, an appropriate package 525 describing the printed circuit board upon which the final semiconductor product will be mounted, and an application set 510 are selected. The chip designer selects a package description 525 from available technology libraries. The package description 525 includes such details as the die size and power ratings, the power plane configuration, the signal and power pin locations, and other information from the printed circuit board file. The files of this application set 510 include input tables to the I/O resource database 534. These input tables are merely tabulations of the I/O types, frequency, I/O voltages, placement position, etc. When the I/O resource database 534 contains the appropriate input tables from the slice description 512 and packaging 525, the I/O generation tool 530 creates a preliminary engineering design interchange file (EDIF) and the preliminary port list of the core module. In addition, the input tables are used by the I/O generation tool to create the I/O netlist for the top module 450 from a description of the pin locations of the chip corresponding to bonding locations. This I/O netlist is combined with other files in the I/O resource database 534 and the port list of the core module to initiate an iterative process wherein as changes are made, the I/O resource database 534 is updated and the I/O generation tool rerun until there are no more updates. Once the bondout is completed, physical data is imported into the design database 586 for verification and testing to determine, inter alias if the bonded out chip meets the customer I/O requirement.

A subset of the slice definition 512 contains a description of the I/O buffer structures including details of the transistor fabric and physical placement information for configurable I/O, the physical placement and type information for hardmac and standard cell I/Os, if present, and the power rail availability. The chip designer may also provide a description of the design floorplan 516, as a floorplan shell. Built upon the slice definition 512, the floorplan shell 516 may specify placement information for RTL with an affinity to certain I/O blocks or cells. For certain I/O types, such as SPI 4.2, an industry-standard optical interconnect having high speed lines, e.g., up to several gigahertz, the balance in the transistors must be precisely tuned; this information would be included in the floorplan shell 512 of the application set 510. A nonexclusive list of other I/O interfaces incorporated onto the slice definition 512 may further include the JTAG, PLL and test pins, IP cores, or PHYs having multiple channels with specified voltages. Examples of the I/O interface functions to be included in the application set shells include an input/output in SPI 4.2 to output/input 10 Gigabit Ethernet. Once the slice definition 512 and the shells 514 including the floorplan shell 516 of application set have been combined into the input tables, then files for the customer I/O requirement 520 are also input as tables into the I/O resource database 534.

The chip designer creates or receives a customer I/O requirement 520 that is a description of the I/O buffer structures required for an integrated circuit. A buffer structure is intended to buffer the input signal from the electronics within the interior of the chip. A buffer structure might also condition the input signal and match the impedance between the incoming signal and the chip electronics. The customer I/O requirement 520 typically includes data regarding the direction of the dataflow into and out of the chip and whether or not the data will be bidirectional. The customer I/O requirement 520 preferably also indicates whether a terminator in the I/O block is single-ended or differential, the direct current (DC) characteristics such as voltage level and drive strength, the alternating current (AC) performance characteristics such as frequency. The customer I/O requirement 520 would, of course, state the type of IO, e.g., LVTTL, CMOS, Three State, etc., as well as the required logic affinity, and the I/O grouping categories by bus or skew/line length.

The customer I/O requirement 520, the application set 510 comprising the slice definition 512, the shells 514, and the floorplan shell 516, and the package specification 525 are collated as input tables to the I/O generation tool 530 comprising an I/O manager 532, an I/O resource database 534, and an I/O generator 538. The input tables may also have a series of structural templates to address some top module issues, for example, there may be number of different ways that PLLs can be connected depending upon the application set and the cores involved. The I/O generation tool 530 accesses this data and produces a whole set of design views to complete the top module. All that remains is to stitch up the boundary scan to the NAND tree, etc.

The I/O resource database 534 keeps track of available and consumed I/O resources and provides that information to the I/O manager 534. For instance, recall that the I/O resources used by the application set are marked as unavailable for the I/O generation tool. The I/O manager 532 selects and matches the available I/O buffer structures from the resources listed in the I/O resource database 534 to the customer I/O requirement 520; alternatively an I/O resource selector (not shown) may take on some or all of the selection and assignment tasks of the I/O manager 532. The I/O manager 532 further determines the best placement of the I/O buffer structures based on affinity, power, voltage, availability, and knowledge of the printed circuit board upon which the chip is to be mounted. Preferably, the I/O manager 532 manages and automates the required reference voltage-to-signal ratio if required by a specific I/O block. There may be customer "sticks" or other restrictions for insertion of isolated I/O power planes. Preferably, the slice and application set have been prearranged to have bankable power regions, i.e., a limited set of regions, each configured with an independent voltage, i.e., a power split. The I/O manager 532 further provides configuration information to the I/O generator 538. Another function of the I/O manager 532 is that it assigns manufacturing test signals from the manufacturing shell 514 of the application set 510.

Status information from the integrator 580, comprising the design integrator 582, the design database 584, and the design qualifier 586 are also input to the I/O manager 532. The I/O manager 532 reconciles not only the status information but also any error/warning information from the design qualifier 586 with the customer I/O requirement 520. The I/O generator 538 takes configuration data from the I/O manager 532 and generates the correct RTL of the I/O buffer structures from the transistor fabric, and the RTL is ultimately incorporated into design views 550 that comprise metallization, timing, test structure and connectivity information in the form of scripts and RTL code. When a configurable I/O is specified and will be used, the I/O generator 538 specifies the metal personalization by calling out a template for that type and further calls out a logical template that specifies how this I/O will be used. The I/O resource database 534 is updated and a name is created within for the newly created I/O. Metal configurable I/Os allow late personalization of a particular I/O diffused area, i.e., the functionality and operating voltage level of the I/O are characterized. An example of the two phases of the personalization of the base layer diffused I/O areas of 0.18 micron technology is presented in the chart below.

Phase I

Bi-CMOS/LVTTL 4 ma (3.3 V)
Bi-CMOS/LVTTL 4 ma w/PU (3.3 V)
Bi-CMOS/LVTTL 4 ma w/PD (3.3 V)
Bi-CMOS/LVTTL 4 ma (2.5 V)
Bi-CMOS/LVTTL 4 ma w/PU (2.5 V)
Bi-CMOS/LVTTL 4 ma w/PD (2.5 V)
Bi-CMOS/LVTTL 4 ma (1.8 V)
Bi-CMOS/LVTTL 4 ma w/PU (1.8 V)
Bi-CMOS/LVTTL 4 ma w/PD (1.8 V)
Bi-SSTL-2 Class 1
Bi-SSTL-2 Class 2
I/O Power Cell
I/O Ground Cell
Reference Voltage Signal Cell
IIDDTN cell Phase 2

BI-HSTL Class 1 Single End
BI-HSTL Class 2 Single End
BI-HSTL Class 3 Single End
LVDS Differential Input
LVDS Differential Output
Bi-Impedance Match Driver/Receiver
Impedance Match Reference N
Impedance Match Reference P
Impedance Match Vref
Corner Cell
Core Power Cell
Core Ground Cell
Bi-CMOS/LVTTL 2, 8, 12 ma (3.3 V, 2.5 V, 1.8 V)
BI-HSTL Class 4
LVPECL -Input
PC 166
Analog Power/Analog Ground When a configurable I/O or diffused area is not used, the I/O generator 538 creates a default configuration that does not cause a static discharge problem. A regular but unused I/O cell may be configured by the I/O generation 538 as a high impedance receiver to avoid current draw. Other alternatives to disable a configurable or diffused I/O area is to use a diode tie off cell (TBD); or to connect the unused I/O block to VDD or VSS or ESD. In the case of a high impedance receiver, the input would be terminated in a test-friendly way in the stubs component of the top module and would also be included in the boundary scan chain to be tested to ensure that it is not electrically virulent. The VDD/VSS/ESD power mesh would be connected to the unused I/O block, and it is not clear what if anything needs to be done with a diode tie off cell.

These design views 550 are used as inputs to timing, synthesis, physical layout andd placement shells of the application set and integrated in the design database 584 by the design integrator 582 to provide integration status to the I/O manager 532. The design qualifier 586 has an RTL or netlist analysis shell, a verification shell, a static timing analysis shell, and a manufacturing test shell that determines, inter alia, if the design views are likely to meet timing under a set of design margin or technology assumptions. The design qualifier 586 will also provide the power consumption contribution of a particular I/O block and I/O buffer structure and the total power consumption of all the I/O to the integrator 580 and determine if the power plane limitations of the slice definition 512 and the specification 525 are observed. The design qualifier 586 further qualifies the design views by determining if the I/O placement is commensurate with associated logic affinities and if the I/O skew specifications are within tolerances.

The customer I/O requirement 520 may be modified in an iterative and incremental fashion to facilitate design exploration in all phases of the design process. For example, early in the design process, the designer may only specify I/O names, direction, and types to understand how the design will fit within certain slice or package constraints. As the design process progresses and more is known about the chip layout and associated board design, the designer may wish to specify more information concerning logic affinity, performance, and grouping. As the design nears completion, more exhaustive specification can be made to gain assurance that the final product will match desired outcomes. Thus, in one embodiment of the invention herein, the I/O generation tool and the shells can be run at an abstracted level to let the designer know if the desired I/O placement and types will fit into the design and provide expected performance goals. The allocation and qualification of I/O buffer structures can be iterative wherein each iteration is more exact by working with actual synthesis and timing data to answer the same questions with much better precision and accuracy. In early design exploration for example, exact qualification information may not be desired because of time constraints or because the input data is incomplete, whereas late in the design process high precision and accuracy are desired to prove product quality. If additional resources are to be added, or if another iteration might be undertaken to change the placement and or RTL or consider of I/O buffer structure parameters, then the I/O generation tool can run to consider such an incremental change. Alternatively, if a generated netlist cannot be qualified, then the designer has an option of, e.g., substituting either the customer requirement or the slice description with another. The I/O generation tool can be run in a global mode whereby this overall substantive design change can be easily managed and its results quickly evaluated.

When an application set developer uses the I/O generation tool and the other generation tools referenced herein, she/he will create the baseline end user I/O structure and resources that comply with this structure. When an end user uses the I/O generation tool herein, it facilitates an environment where the effect of the service functions, such as test, bondout, power, etc., have a significantly reduced impact upon their design time as well as our design/processing time.

While the invention herein has been presented in terms of specific and preferred embodiments, the invention is not limited by the details therein. Rather the inventions may be broadly construed as by the following claims and their equivalents.

What is claimed is:

1. An input/output (I/O) buffer structure generation tool, comprising:
   (a) an I/O manager having as input a description of a slice and a request for at least one I/O buffer structure;
   (b) an I/O resource database comprising a plurality of available I/O resources of the slice description, at least a portion of the I/O resources comprising a transistor fabric;
   (c) the I/O manager capable of allocating candidate I/O resources from the available I/O resources of the slice to satisfy the request and:
   (d) an I/O composer capable of generating at least connect and test RTL from the transistor fabric and a plurality of generated I/O designs of the allocated I/O resources to satisfy the request.

2. The I/O buffer structure generation tool of claim 1, wherein the available I/O resources comprise at least one diffused configurable I/O block.

3. The I/O buffer structure generation tool of claim 1, wherein the available I/O resources comprises at least one I/O hardmac.

4. The I/O buffer structure generation tool of claim 1, further comprising a plurality of shells to qualify the generated I/O designs, the plurality of shells comprising:
   (a) an RTL analysis shell to analyze the at least connect and test RTL;
   (b) a verification shell to verify that the at least connect and test RTL;
   (c) a manufacturing test shell to implement at least one logic test on the I/O resources and the at least connect and test RTL; and
   (d) a static timing analysis shell to verify correct timing of clock and signals within the I/O resources and the at least connect and test RTL.

5. The I/O buffer structure generation tool of claim 4, wherein the generated I/O designs further comprise a top module, the top module further comprising: a first test controller to test the top module, at least one phase locked loop, at least one configurable I/O and/or I/O hardmac I/O, and a netlist of the I/O resources.

6. The I/O buffer structure generation tool of claim 6, wherein the top module further comprises a stub file of the RTL to terminate any unused configurable and/or hardmac I/O resources.

7. The I/O buffer structure generation tool of claim 5, wherein the generated I/O designs further comprises a generated module, the generated module comprising a clock generator, a system controller, a second test controller to test a plurality of resources of the slice description other than resources in the top module.

8. The I/O buffer structure generation tool of claim 7, wherein the generated I/O designs further comprise a user module incorporating the generated module of claim 7 and further comprising I/O logic resources provided by a the request.

9. The I/O generation tool of claim 8, wherein the generated I/O resource designs further comprise a fixed module as part of an application set having the slice description and the plurality of shells to match and bind any configurable I/O and/or hardmac I/Os included in the slice description, and a core module to interconnect the fixed module and the user module.

10. An I/O buffer structure generation tool, comprising:
    (a) an I/O manager having as input a description of a slice and a request for at least one I/O buffer structure of a semiconductor product;
    (b) an I/O resource database comprising a plurality of available I/O resources of the slice description, the available I/O resources comprising diffused configurable I/O, hardmac I/O, and transistor fabric, the I/O manager to maintain and update the I/O resource database to indicate that a portion of the transistor fabric has been allocated as RTL for connection and testing of the requested I/O buffer structure and;
    (c) an I/O composer capable of generating a plurality of designs views of the RTL and the requested I/O buffer structure.

11. The I/O buffer structure generation tool of claim 10, further comprising:
    (d) a design database of at least one diffused configurable block, at least one hardmacs, and at least portions of the transistor fabric assigned and configured for and other functions of the semiconductor product;
    (e) a design integrator to integrate the plurality of design views into the plurality of other functions of the semiconductor product, and (f) a design qualifier to determine if the plurality of design views is compatible with the plurality of other functions of the semiconductor product.

12. An article of manufacture, comprising a data storage medium tangibly embodying a program of machine readable instructions executable by an electronic processing apparatus to perform method steps for operating an electronic processing apparatus, said method steps comprising the steps of:

(a) reading a description of a slice having at least a transistor fabric or at least a diffused configurable I/O or at least one I/O hardmac;

(b) reading a specification of at least a first requested I/O buffer structure for a semiconductor product;

(c) determining if the specification of the at least first requested I/O buffer structure can be generated from an application set, the application set comprising a description of the slice and a plurality of shells;

(d) allocating a portion of the transistor fabric of the slice description to the at least first requested I/O buffer structure;

(e) generating a logic infrastructure for the allocated portion using at least one of the plurality of shells;

(f) creating an I/O design having the logic infrastructure of the allocated portion using at least one of the plurality of shells; and (g) updating an I/O resource database to indicate the allocated portion is not available for a second requested I/O buffer structure.

13. The article of manufacture of claim 12, wherein the method steps embodied in the program of machine readable instructions executable by an electronic processing apparatus further comprises the step of testing and verifying the created I/O design using one or more of the plurality of shells.

14. The article of manufacture of claim 12, wherein the method steps embodied in the program of machine readable instructions executable by an electronic processing apparatus further comprises the steps of:

(h) determining if the specification of the second requested I/O buffer structure can be generated from the description of the slice;

(i) allocating a second portion of the transistor fabric to the second requested buffer structure;

(j) generating logic infrastructure for the second allocated portion;

(k) creating a second I/O design of the first and second allocated portion; and (l) updating an I/O resource database to indicate the second allocated portion is not available for a third requested I/O buffer structure.

15. The article of manufacture of claim 14, wherein the method steps embodied in the program of machine readable instructions executable by an electronic processing apparatus further comprises the step of testing and verifying the second I/O design using one or more of the plurality of shells.

16. The article of manufacture of claim 15, wherein the method steps embodied in the program of machine readable instructions executable by an electronic processing apparatus further comprises the step of testing and verifying the first, the second, and all subsequent I/O designs of all of allocated portions of the transistor fabric using the plurality of shells.

17. A method of generating I/O designs for a generated semiconductor product, comprising the steps of:

(a) inputting a database of a description of an application set, the application set having a shell description comprising a transistor fabric and at least one available diffused configurable I/O resource or at least one available I/O hardmac into an I/O resource database;

(b) inputting a request for at least one I/O buffer structure; and (c) allocating a portion of the transistor fabric and generating RTL of the at least one requested I/O buffer structure.

18. The method of claim 17, further comprising analyzing, verifying, and testing the logic and timing of the allocated portion of the transistor fabric and generated RTL of the at least one requested I/O buffer structure using a plurality of shells comprising at least a RTL analysis shell, a verification shell, a static timing analysis shell, and a manufacturing test shell.

19. The method of generating I/O designs as in claim 17, further comprising:

(a) inputting a request for a subsequent requested I/O buffer structure; and (c) allocating a portion of the transistor fabric and generating RTL of the subsequent requested I/O buffer structure.

20. The method of claim 17, further comprising analyzing, verifying, and testing the logic and timing of the allocated portion of the transistor fabric and generated RTL of the first and subsequent requested I/O buffer structures using the plurality of shells.

21. The method of claim 18, wherein the plurality of shells further comprises a documentation shell, a synthesis shell, and a floorplan shell to generate at least a documentation design view and a location design view of the physical location of the first and subsequent requested I/O buffers structures of the generated semiconductor product.

22. An I/O generation tool comprising:

(a) means to read a slice description having at least a transistor fabric;

(b) means to read a specification of a requested I/O;

(c) means to determine if the requested I/O can be generated from the transistor fabric;

(d) if not, means to notify a designer;

(e) if so, means to allocate a portion of the transistor fabric to the requested I/O;

(f) means to determine if there is additional transistor fabric available from the slice description;

(g) means to determine if there is a second requested I/O buffer;

(h) means to allocate a second portion of the transistor fabric to the second requested I/O; and (i) means to generate I/O designs of the allocated portions.

* * * * *